(12) United States Patent
Lazar

(10) Patent No.: US 7,626,511 B2
(45) Date of Patent: Dec. 1, 2009

(54) AMR TRANSMITTER AND METHOD FOR BOTH NARROW BAND AND FREQUENCY HOPPING TRANSMISSIONS

(75) Inventor: Mark Lazar, New Berlin, WI (US)

(73) Assignee: Badger Meter, Inc., Milwaukee, WI (US)

( * ) Notice: Subject to any disclaimer, the term of this patent is extended or adjusted under 35 U.S.C. 154(b) by 234 days.

(21) Appl. No.: 11/451,027

(22) Filed: Jun. 12, 2006

(65) Prior Publication Data

US 2007/0285276 A1    Dec. 13, 2007

(51) Int. Cl.
*G08B 1/00* (2006.01)
(52) U.S. Cl. .............. 340/870.02; 340/870.01; 340/870.18; 370/310; 370/338
(58) Field of Classification Search ............ 340/870.02, 340/870.01, 870.18; 370/310, 338
See application file for complete search history.

(56) References Cited

U.S. PATENT DOCUMENTS

| | | | |
|---|---|---|---|
| 4,940,976 A | 7/1990 | Gastouniotis et al. |
| 5,056,107 A | 10/1991 | Johnson et al. |
| 5,298,894 A | 3/1994 | Cerny et al. |
| 6,201,976 B1 | 3/2001 | Räsänen |
| 7,057,525 B2 | 6/2006 | Giles et al. |
| 2003/0020632 A1 | 1/2003 | Giles et al. |
| 2005/0068193 A1 | 3/2005 | Osterloh et al. |
| 2005/0195775 A1 | 9/2005 | Petite et al. |
| 2005/0237959 A1 | 10/2005 | Osterloh et al. |

*Primary Examiner*—Brian A Zimmerman
*Assistant Examiner*—Hung Q Dang
(74) *Attorney, Agent, or Firm*—Boyle Fredrickson, S.C.

(57) ABSTRACT

The invention provides a method and circuitry for transmitting signals in both a narrow band, mobile-receiver type of AMR network and also for operation in the frequency-hopping, spread-spectrum, fixed-receiver type of AMR network. Unlike systems provided with multiple transmitters, the invention provides this in a single transmitter operating with common circuitry to transmit in two modes of transmission in a single operational sequence.

18 Claims, 4 Drawing Sheets

AMR TRANSMITTER AND METHOD FOR BOTH NARROW BAND AND FREQUENCY HOPPING TRANSMISSIONS

TECHNICAL FIELD

This invention relates to automatic meter reading (AMR) systems, and in particular to utility meters using a radio transmitter for transmitting metering data signals to a radio receiver in a network for collecting utility metering data.

DESCRIPTION OF THE BACKGROUND ART

Cerny et al., U.S. Pat. No. 5,298,894, discloses a mobile automatic meter reading (AMR) system in which a utility meter transmitter receives pulses from a pulse transducer installed on a utility meter and transmits radio frequency (RF) meter data signals to an RF collection unit in a drive-by vehicle. In these mobile AMR systems, a vehicle or a person on foot with an RF collection unit (a walk-by collection system) can move through a neighborhood and collect a large number of readings per hour without entering any of the property of the customers.

Gastouniotis et al., U.S. Pat. No. 4,940,976, discloses a communications network for transmitting data from a plurality of remote meters to a central station through a plurality of fixed receiving stations. In fixed receiver network systems today, the receiver units can be mounted on utility poles, inside of electric meters or in utility pedestals. In such systems, it is not necessary to provide people and equipment to travel through the areas where readings are to be collected. There are, however, other issues is locating receivers and providing other equipment, such as repeaters, to provide coverage of the entire geographic area being serviced.

Mobile collection units and their associated transmitters operate in the unlicensed band around 915 Mhz, where transmissions are only required to reach distances of a few hundred feet, but must be sent out frequently to be available for a drive-by or walk-by collection unit at random times of collection. The unlicensed band is in a narrow range of the radio frequency spectrum, where power associated with the transmission signals is limited, to prevent interference in various areas where the equipment is operating with other RF signals in the environment. Fixed networks, on the other hand, transmit signals over distances of more than 1,000 feet and up to distances of one-half mile or more. Fixed network transmitters typically utilize a frequency-hopping, spread-spectrum type of transmission, which by regulation is permitted to use transmitter power levels 1000 times greater than the narrow band systems.

Mobile data collection systems and fixed data collection systems are competing in the marketplace today as gas, electric and water utilities move toward automation in the collection of metering data and the billing of utility customers.

Many utilities purchasing automatic meter reading systems today must consider system issues over a period of years. It would therefore be beneficial to the acceptance of such systems to provide these customers with the maximum long term system capabilities at a minimum reasonable cost including the costs associated with the installation, servicing and upgrading of the transmitters over the life of the system as a whole.

SUMMARY OF THE INVENTION

The invention provides a method and circuitry for transmitting signals in both a narrow band, mobile-receiver type of AMR network and also for operation in the frequency-hopping, spread-spectrum, fixed-receiver type of AMR network. Unlike systems provided with multiple transmitters, the invention provides this in a single transmitter operating with common circuitry to transmit in two modes of transmission. The AMR network is preferably of the one-way type in which the transmitter initiates communication with the receiver.

The method more particularly comprises transmitting a first plurality of narrow band signals at a first, limited power level; and transmitting a second plurality of frequency-hopping, spread-spectrum signals at a second limited power level that is greater than the first power level by at least one order of magnitude.

The narrow band frequency signals are transmitted at first intervals of less than one minute over a plurality of hours, and the second plurality of frequency-hopping, spread spectrum signals are transmitted at second intervals which are longer than the first intervals by at least one order of magnitude.

The invention also relates to transmitter circuitry for carrying out the method of the invention.

In a further aspect of the invention, the transmitter circuitry further comprises a CPU operating according a stored control program; and a radio frequency modulation section for modulating meter data signals into radio signals for transmission, with these circuits acting as a single transmitter for transmitting both types of signals.

The circuit is low in cost, and very versatile in serving different types of networks, thereby saving utility customers costs in the event they may utilize more than one type of AMR system over the life of the transmitter.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENTS

Figure 1:
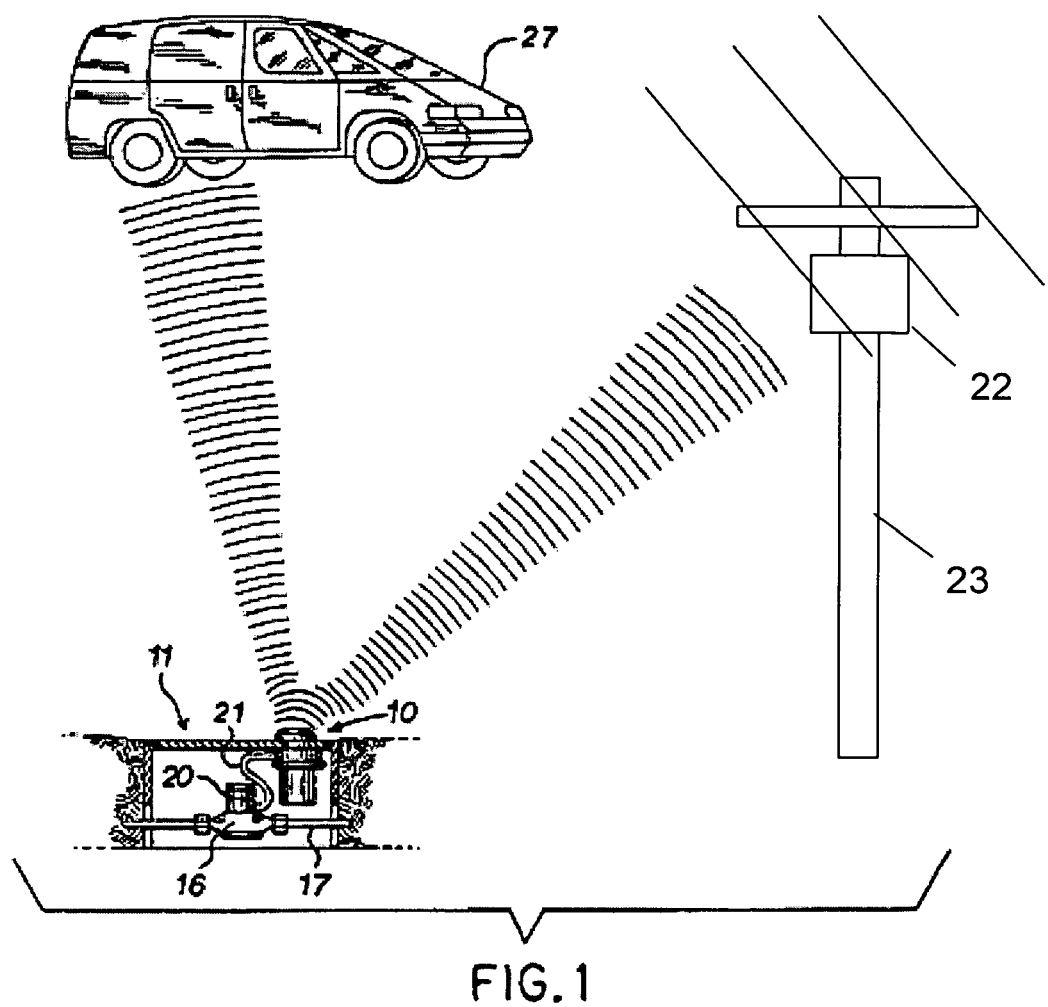
FIG. 1 is a perspective view of an AMR system with both mobile and fixed receivers for receiving transmissions from a transmitter associated with a utility meter.

Referring to FIG. 1, one example of an environment of the invention is provided by a subsurface pit enclosure 11. The pit is typically made of metal, concrete, plastic or other materials and a lid which is removable to open the enclosure 11 for access. The pit enclosure 11 is located along the route of water supply pipe 17. A water meter housing 16 is connected in the water supply line 17. A water meter register unit 20 is mounted on top of the water meter housing 16. As known in the art, meter registers convert mechanical movements of a meter to visual and numerical representations of consumption often shown in an odometer type read-out device. The register 20 is preferably a unit that is commercially distributed by Badger Meter, Inc., the assignee of the present invention, under the trade designation "Recordall" Transmitter Register (RTR). Besides displaying units of consumption, this device 20 uses a pulse transmitter that is described in Strobel et al., U.S. Pat. No. 4,868,566, entitled "Flexible Piezoelectric Switch Activated Metering Pulse Generators," to convert the mechanical movements of the meter to electrical signals. Other metering transducers known in the art an using optics and an analog-to-digital encoder (ADE) circuit can also be used as the register 20.

The register 20 connects via a shielded cable 21 to a transmitter assembly 10, which is housed in a tubular housing of plastic material that hangs down from the pit lid. The register 20 transmits electrical signals to the transmitter assembly 10, for further transmission through a radio network. Besides the cable 21, it is also known in the art to transmit these signals wirelessly to an antenna mounted in the pit lid as well.

The transmitter assembly 10 communicates via low power RF signals with a receiver which can be a mobile receiver (not shown) in a vehicle 27. The pit transmitter assembly 10 transmits an electronic message that includes an identification code, meter reading data, and an error code for checking the data at the receiving end. The meter data is collected from various customer locations for billing purposes.

In the present invention, the transmitter assembly 10 can also communicate via higher power RF signals with a fixed receiver 22 installed on a utility pole 23 within a range of one thousand feet of the transmitter unit 10. The pit transmitter assembly 10 transmits an electronic message that includes an identification code, meter reading data, and an error code for checking the data at the receiving end. The meter data is collected from various customer locations for billing purposes.

Figure 2:
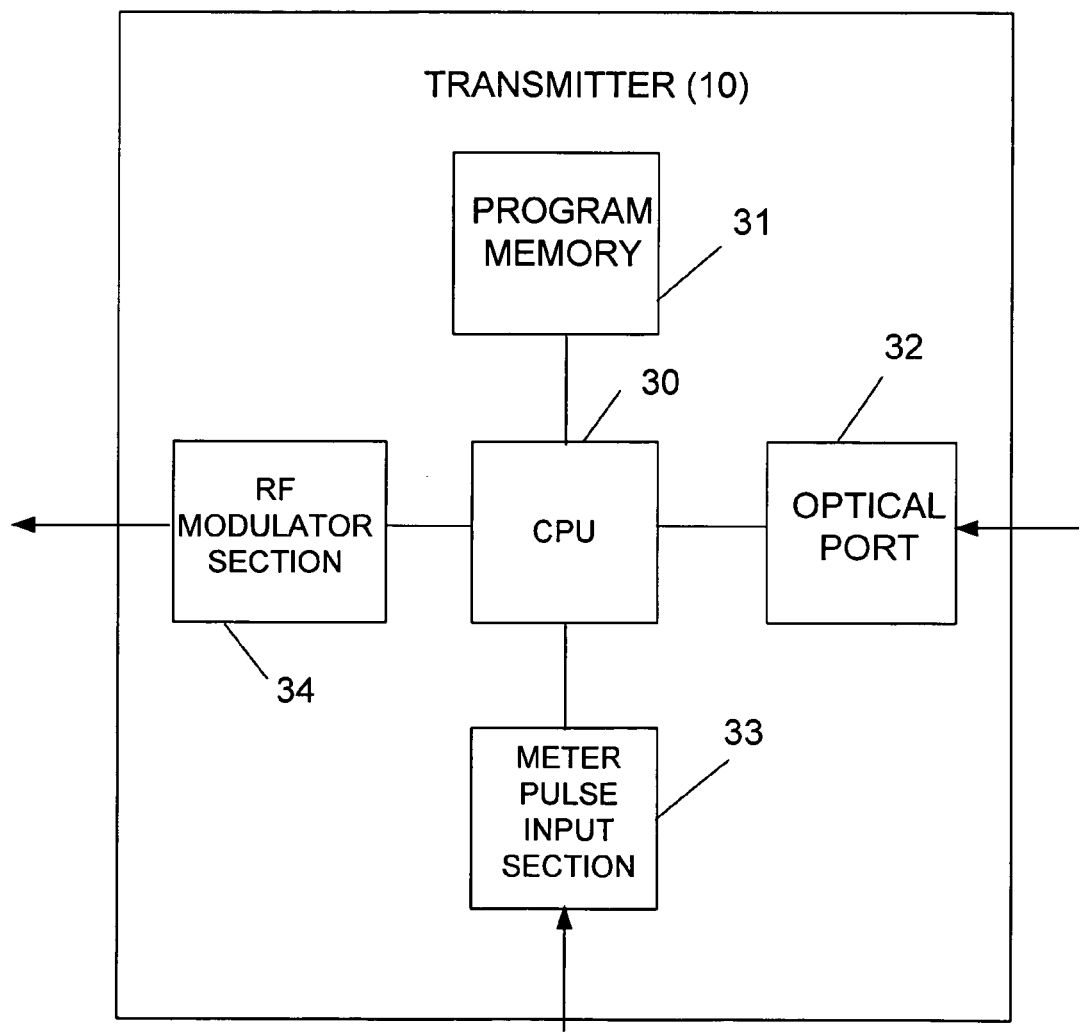
FIG. 2 is a block diagram of a metering data transmitter associated with a utility meter.

Referring to FIG. 2, the transmitter assembly 10 also includes an electrical circuit typically formed on a circuit board and including a microelectronic CPU 30 operating according to a control program stored in a program memory 31, which in this case is an electrically erasable and programmable read only memory (EEPROM). Thus, the memory is nonvolatile but can only be altered with a special programming unit, which communicates with the transmitter through an optical I/O port 32.

As further seen in FIG. 2, the CPU 30 receives pulses from a pulse encoder (not shown) through a meter pulse input section 33. This input section can receive a pulse input or an input from an analog-to-digital encoder (ADE) circuit of a type known in the art. It then transmits metering data in a message protocol, which is converted to radio frequency (RF) signals by an RF modulator section 34.

The AMR transmitter 10 has two modes of operation and operates on a one-way AMR network. In a one-way AMR network, with narrowband receivers, the transmitter 10 will transmit in the narrow band mode of operation most of the time. In this mode, the transmitter will normally be in a sleep mode from which it will periodically wake-up and send a message on a single frequency within the 902-928 Mhz frequency band and in accordance with FCC regulations. This is a one-way network in which the transmitter initiates communication with the receiver. The power level of the transmission is limited by FCC regulations. This limit for this mode of operation is determined to be 94 dB microvolts/meter. At a transmission distance of three meters through a 50-ohm load, this is considered to be a transmission power level limit of approximately one (1) milliwatt. Drive-by vehicles 27 will be able to read the transmitter signal and collect meter readings.

The type of system uses a battery for power and this mode of transmission provides long battery life using small batteries. This signal may be read by fixed receivers 22 provided they are not too far from the transmitter. However, due to the need to cover geographic areas, the receivers may be further away than the optimum range for narrow band operation and may require transmission at a higher power level.

Therefore, it would be desirable to provide a second transmitter or a second type of transmission for fixed network systems utilizing a higher power level. In the present invention, this is accomplished by periodically sending out a higher power signal according to a frequency-hopping spread-spectrum mode of operation, which is the subject of different FCC regulations permitting a higher power level. This power level is limited to ¼ watt for a number of channels from 25 to 50 channels and to one (1) watt for systems utilizing at least 50 channels. In the present embodiment, the lower number of channels and the lower power limit is selected, but in other embodiments of the invention the higher number of channels can be used to further utilize the higher power limit. This transmission can be made at longer intervals than the narrow band transmissions which must be available to a drive-by or walk-by receiver at random times. The fixed receiver is always present, so a frequency of transmission on the order of an hour or longer is acceptable. After the higher power transmission, the transmitter 10 returns to narrow band operation transmitting lower power pulses at 4-second intervals.

It is a further aspect of the invention that these signals are transmitted by the same transmitter in a single operational sequence.

Figure 3:
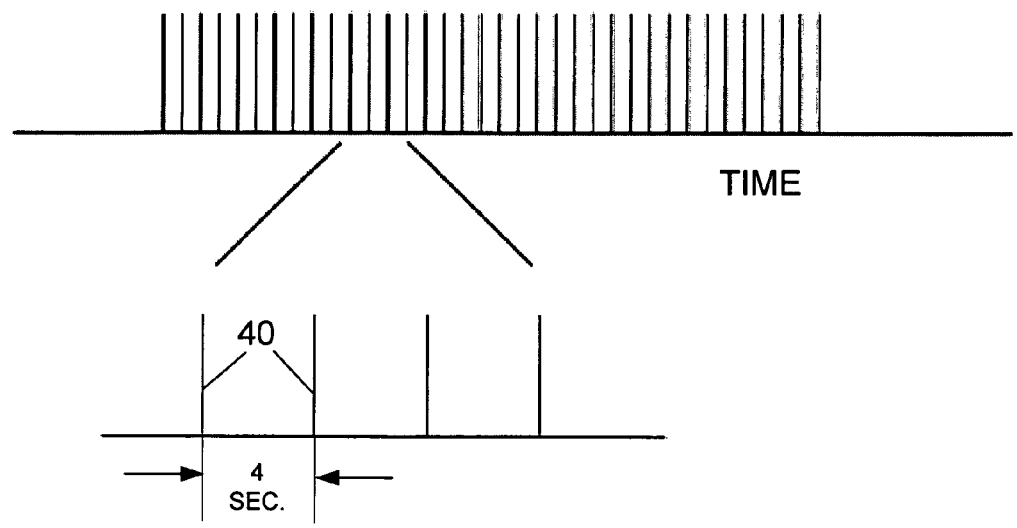
FIG. 3 is a schematic view of transmission pulses vs. time for the transmitter of FIG. 2 in a first mode of operation.

Referring to FIG. 3, the narrow band operation is represented by pulses 40 sent out at intervals of every 4 seconds, for example.

Figure 4:
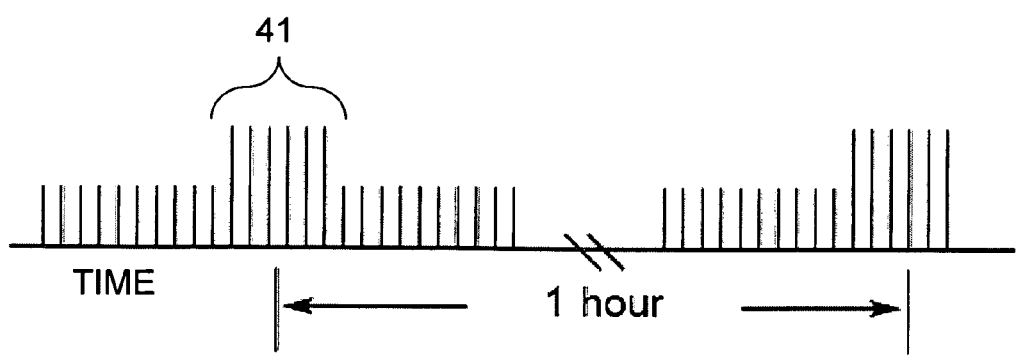
FIG. 4 is a schematic view of transmission pulses vs. time for the transmitter of FIG. 2 in first and second modes of operation.
Figure 5:
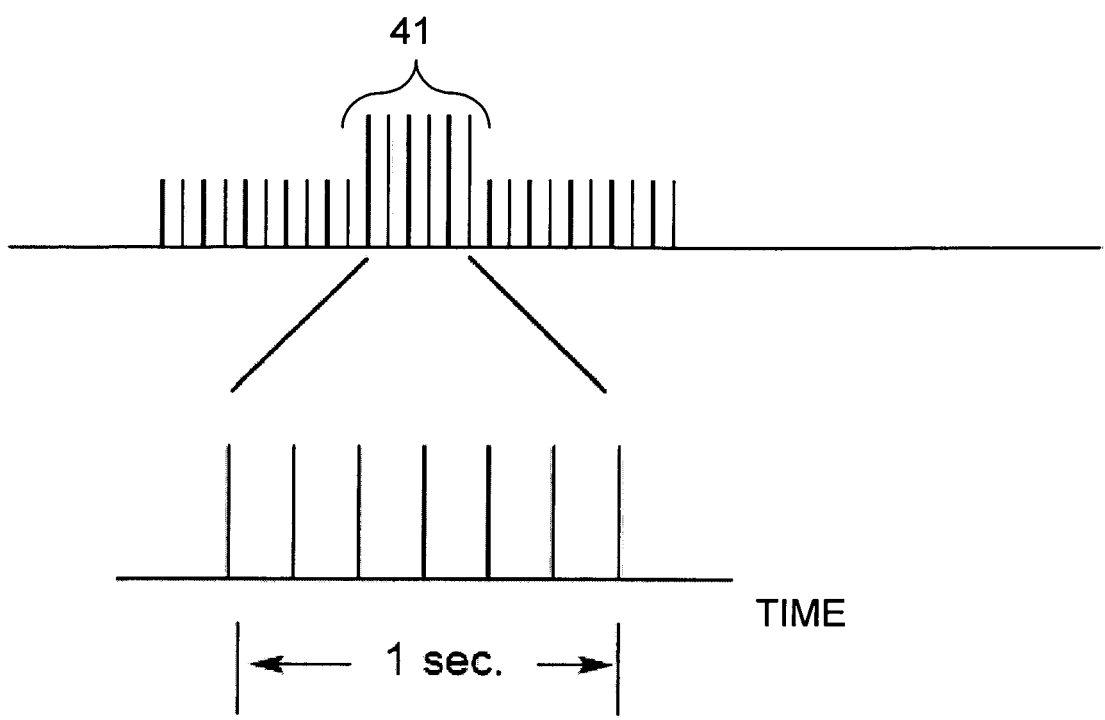
FIG. 5 is a schematic detail view of transmission pulses in the second mode of operation seen in FIG. 4.

Referring to FIG. 4, the full transmitter signaling operation is shown over a period of one hour with low power pulses transmitted every 4 seconds and with a group of twenty-five high power pulses 41 sent out over twenty-five spread spectrum frequencies within a one-second interval (FIG. 5), but the group of high power pulses are separated from the next such group by a longer interval of approximately one hour, as illustrated in FIG. 4. Only some of the twenty-five pulses 41 in each group of twenty-five have been illustrated to represent the group.

An alternative method would provide a high power transmission at six-minute intervals (ten times) within one hour once a day (once each 24 hours).

One advantage of the invention, is that it requires only a single transmitter and provides both modes of operation with common circuitry.

Another advantage of the invention is that it conserves battery life.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

I claim:

1. A utility meter interface unit configured to connect in a one-way automatic meter reading network, the utility meter interface unit comprising:

transmitter circuitry configured to transmit a first plurality of narrow band signals at a first, limited power level for reception by a drive-by receiver and configured to transmit second pluralities of frequency-hopping, spread-spectrum signals at a second limited power level that is greater than the first power level by at least one order of magnitude for reception by a receiver in a fixed network; and wherein the transmitter circuitry is configured to transmit the narrow band frequency signals at first intervals of less than one minute over a plurality of hours, except when interrupted for transmitting one of the second pluralities of frequency-hopping spread-spectrum signals at a second interval which is longer than the first interval by at least one order of magnitude;

wherein the first plurality of narrow band signals and one of the second pluralities of frequency hopping signals are each transmitted during respective intervals within a single operational sequence; and wherein transmitting the narrow band signals for reception by a drive-by receiver at the first intervals more frequently than the spread spectrum signals transmitted for reception by a receiver in a fixed network at the second intervals provides communication for drive-by receivers while conserving power in the utility meter interface unit.

2. The utility meter interface unit as recited in claim 1, wherein the transmitter transmits the second pluralities of frequency hopping spread spectrum signals at one hour intervals.

3. The utility meter interface unit as recited in claim 1, wherein the transmitter transmits a plurality of the frequency hopping spread spectrum signals a plurality of times within one hour of a twenty-four hour time period.

4. The utility meter interface unit as recited in claim 1, wherein the first intervals are four seconds.

5. The utility meter interface unit as recited in claim 4, wherein the second intervals are approximately one hour.

6. The utility meter interface unit as recited in claim 1, wherein the first power level is limited to be no greater than one milliwatt.

7. The utility meter interface unit as recited in claim 6, wherein the second power level is in a range from at least ten times the first power level to one watt.

8. The utility meter interface unit as recited in claim 1, further comprising:
a CPU operating according a stored control program; and
a radio frequency modulation section for modulating meter data signals into RF signals for transmission.

9. The utility meter interface unit recited in claim 1, wherein the first plurality of narrow frequency band signals and the second plurality of frequency hopping spread spectrum signals are transmitted by common circuitry comprising a single transmitter.

10. The utility meter interface unit of claim 1, wherein the first plurality of narrow band signals and the second pluralities of frequency hopping signals are transmitted within a frequency range between 902 Mhz and 928 Mhz.

11. A method of transmitting radio frequency signals representing utility metering data, the method comprising:
transmitting a first plurality of narrow band signals at a first, limited power level for reception by a drive-by receiver; and
transmitting a second plurality of frequency hopping spread spectrum signals at a second limited power level that is greater than the first power level by at least one order of magnitude for reception by a receiver in a fixed network; and
wherein the narrow band signals are transmitted at first intervals of less than one minute over a plurality of hours, and wherein the second plurality of frequency-hopping, spread spectrum signals is transmitted at a second interval which is longer than the first interval by at least one order of magnitude;
wherein the first plurality of narrow band signals and one of the second pluralities of frequency hopping signals are transmitted during respective intervals within a single operational sequence; and
wherein transmitting the narrow band signals for reception by a drive-by receivers at first intervals more frequently than the spread spectrum signals transmitted for reception by a receiver in fixed network at the second intervals provides communication for drive-by receivers while conserving power in a utility meter interface unit.

12. The method as recited in claim 11, wherein the second pluralities of frequency-hopping, spread-spectrum signals are transmitted at one hour intervals.

13. The method as recited in claim 11, wherein a plurality of the frequency-hopping, spread-spectrum signals are transmitted a plurality of times within one hour of a twenty-four hour time period.

14. The method as recited in claim 11, wherein the first intervals are four seconds.

15. The method as recited in claim 14, wherein the second intervals are approximately one hour.

16. The method as recited in claim 11, wherein the first power level is limited to be no greater than one milliwatt.

17. The method as recited in claim 16, wherein the second power level is in a range from ten times the first power level up to one watt.

18. The method of claim 11, wherein the first plurality of narrow band signals and the second pluralities of frequency hopping signals are transmitted within a frequency range between 902 Mhz and 928 Mhz.

* * * * *